US011518511B2

(12) United States Patent
Shaw

(10) Patent No.: US 11,518,511 B2
(45) Date of Patent: Dec. 6, 2022

(54) UNMANNED AERIAL VEHICLE (UAV) RECOVERY

(71) Applicant: Insitu, Inc., Bingen, WA (US)

(72) Inventor: Daniel Lewis Shaw, White Salmon, WA (US)

(73) Assignee: INSITU, INC., Bingen, WA (US)

(*) Notice: Subject to any disclaimer, the term of this patent is extended or adjusted under 35 U.S.C. 154(b) by 482 days.

(21) Appl. No.: 16/665,547

(22) Filed: Oct. 28, 2019

(65) Prior Publication Data
US 2020/0283145 A1    Sep. 10, 2020

Related U.S. Application Data

(60) Provisional application No. 62/814,627, filed on Mar. 6, 2019.

(51) Int. Cl.
*B64C 39/02* (2006.01)

(52) U.S. Cl.
CPC ........ *B64C 39/024* (2013.01); *B64C 2201/12* (2013.01); *B64C 2201/182* (2013.01)

(58) Field of Classification Search
CPC .......... B64C 2201/182; B64C 2201/12; B64C 25/68; B64C 39/024; B64F 1/029
See application file for complete search history.

(56) References Cited

U.S. PATENT DOCUMENTS

| | | | | |
|---|---|---|---|---|
| 7,578,467 B2* | 8/2009 | Goodrich | ............... | B64F 1/029 73/862.392 |
| 7,954,758 B2* | 6/2011 | McGeer | ............... | B64C 39/024 244/110 G |
| 9,434,481 B2* | 9/2016 | McGeer | ............... | B64F 1/0299 |
| 10,414,493 B2* | 9/2019 | McGeer | ............... | B64C 39/024 |
| 10,800,547 B1* | 10/2020 | McGann | ............... | F16F 7/116 |

(Continued)

FOREIGN PATENT DOCUMENTS

| | | |
|---|---|---|
| AU | 2009200804 | 3/2009 |
| CN | 207985192 | 10/2018 |

(Continued)

OTHER PUBLICATIONS

European Patent Office, "Extended European Search Report," issued in connection with European Patent Application No. 20160253.9, dated Aug. 12, 2020, 15 pages.

(Continued)

*Primary Examiner* — Benjamin P Lee
(74) *Attorney, Agent, or Firm* — Hanley, Flight & Zimmerman

(57) ABSTRACT

Unmanned aerial vehicle (UAV) recovery is disclosed. An example apparatus to recover an unmanned aerial vehicle (UAV) includes a support rail to support a cable. The apparatus also includes a pivot arm to rotate about a pivot, where the cable is suspended between the support rail and the pivot arm, and where the pivot arm is rotated to a first orientation when the UAV contacts the cable and rotated to a second orientation when the UAV is brought to a stop. The apparatus also includes at least one of a friction device or a damper operatively coupled to the cable to resist motion of the cable during rotation of the pivot arm from the first orientation to the second orientation.

22 Claims, 6 Drawing Sheets

(56) References Cited

U.S. PATENT DOCUMENTS

| | | | | |
|---|---|---|---|---|
| 2008/0099604 | A1* | 5/2008 | Goodrich | B66C 1/10 244/110 C |
| 2009/0224097 | A1* | 9/2009 | Kariv | B64F 1/029 244/110 F |
| 2009/0294584 | A1* | 12/2009 | Lovell | B64C 39/024 901/30 |
| 2011/0024559 | A1* | 2/2011 | McGeer | B64F 5/40 244/110 F |
| 2012/0223182 | A1* | 9/2012 | Gilchrist, III | B64F 1/0297 244/110 F |
| 2013/0082137 | A1* | 4/2013 | Gundlach | B64C 39/024 244/110 G |
| 2016/0144980 | A1* | 5/2016 | Kunz | B64F 1/02 244/110 C |
| 2018/0050823 | A1* | 2/2018 | McGeer | B64F 1/04 |
| 2018/0086481 | A1* | 3/2018 | Briggs | B64F 1/0299 |
| 2019/0337640 | A1* | 11/2019 | Dennis | B64D 25/06 |
| 2020/0148388 | A1* | 5/2020 | Schrick | B64C 39/024 |
| 2021/0171216 | A1* | 6/2021 | Brown | G05D 1/105 |
| 2021/0214100 | A1* | 7/2021 | Thayer | B64C 39/024 |

FOREIGN PATENT DOCUMENTS

| | | |
|---|---|---|
| EP | 3263455 | 1/2018 |
| GB | 2080216 | 2/1982 |
| WO | 2018222551 | 12/2018 |

OTHER PUBLICATIONS

Chengjing et al., "Parameter Research of UAV Vertical Rope-type Recovery System," MATEC Web Conferences EDP Sciences, vol. 179, May 13, 2018, 10 pages.

* cited by examiner

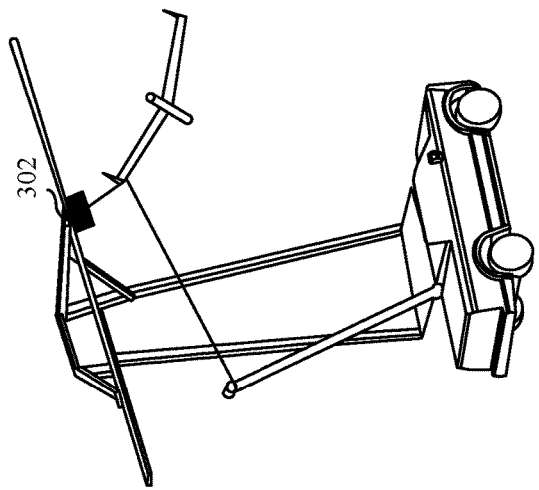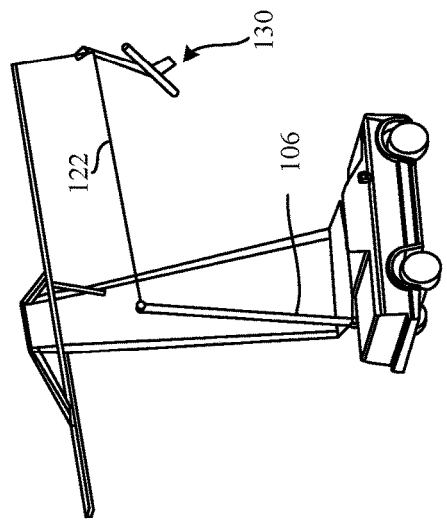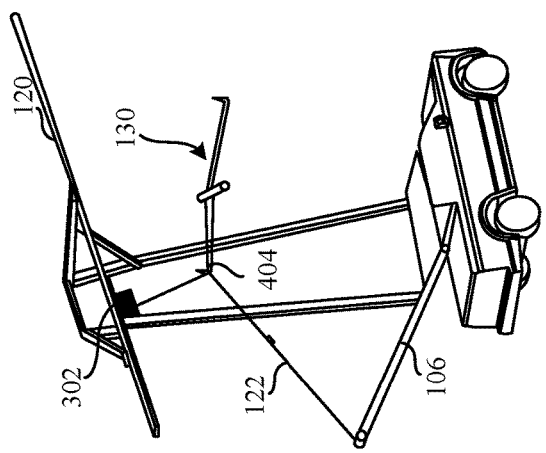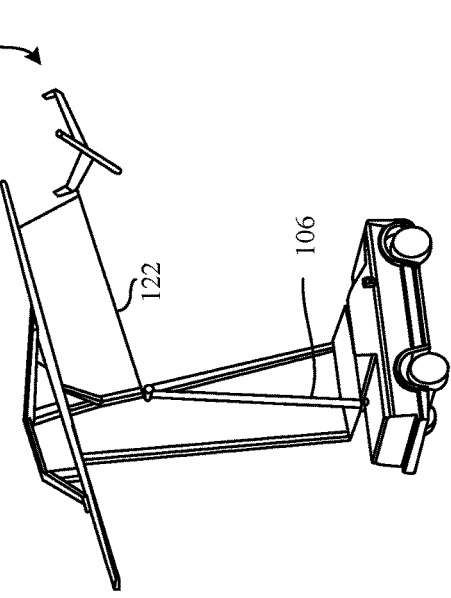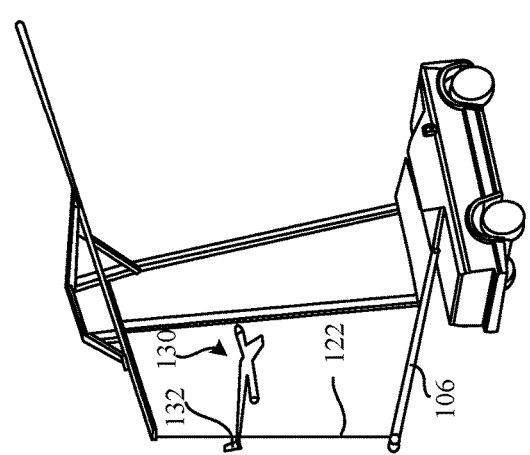

UNMANNED AERIAL VEHICLE (UAV) RECOVERY

RELATED APPLICATION

This patent claims priority to, and the benefit of, U.S. Provisional Patent Application Ser. No. 62/814,627, which was filed on Mar. 6, 2019. U.S. Provisional Patent Application Ser. No. 62/814,627 is hereby incorporated herein by reference in its entirety.

FIELD OF THE DISCLOSURE

This disclosure relates generally to aircraft and, more particularly, to unmanned aerial vehicle (UAV) recovery.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Features and/or components implemented to allow UAVs to land on runways can add weight, drag, complexity and cost. Weight added to allow landing capabilities reduces payload and fuel that can be stored. Accordingly, foregoing the ability to land on runways allows greater range and/or payload, but necessitates capturing a UAV. However, the UAV recovery systems can involve significant weight, cost and complexity. Further, capturing UAVs without the use of a runway enables greater flexibility in recovery locations. In particular, a UAV can be recovered in an unprepared area or on relatively smaller ships.

UAV recovery systems can subject the UAV to significant loads during a recovery process due to sudden deceleration of the UAV as a result of an impact with recovery devices. These significant loads can cause damage to the UAV or necessitate strengthening components or features, thereby increasing cost and weight of the UAV. Further some UAV recovery systems can entail frequent, chaotic and uncontrolled landing events, thereby potentially resulting in damage.

BRIEF DESCRIPTION OF THE DRAWINGS

FIGS. 4A-4E illustrate example time steps of a UAV recovery process that implements examples disclosed herein.

Figure 1:
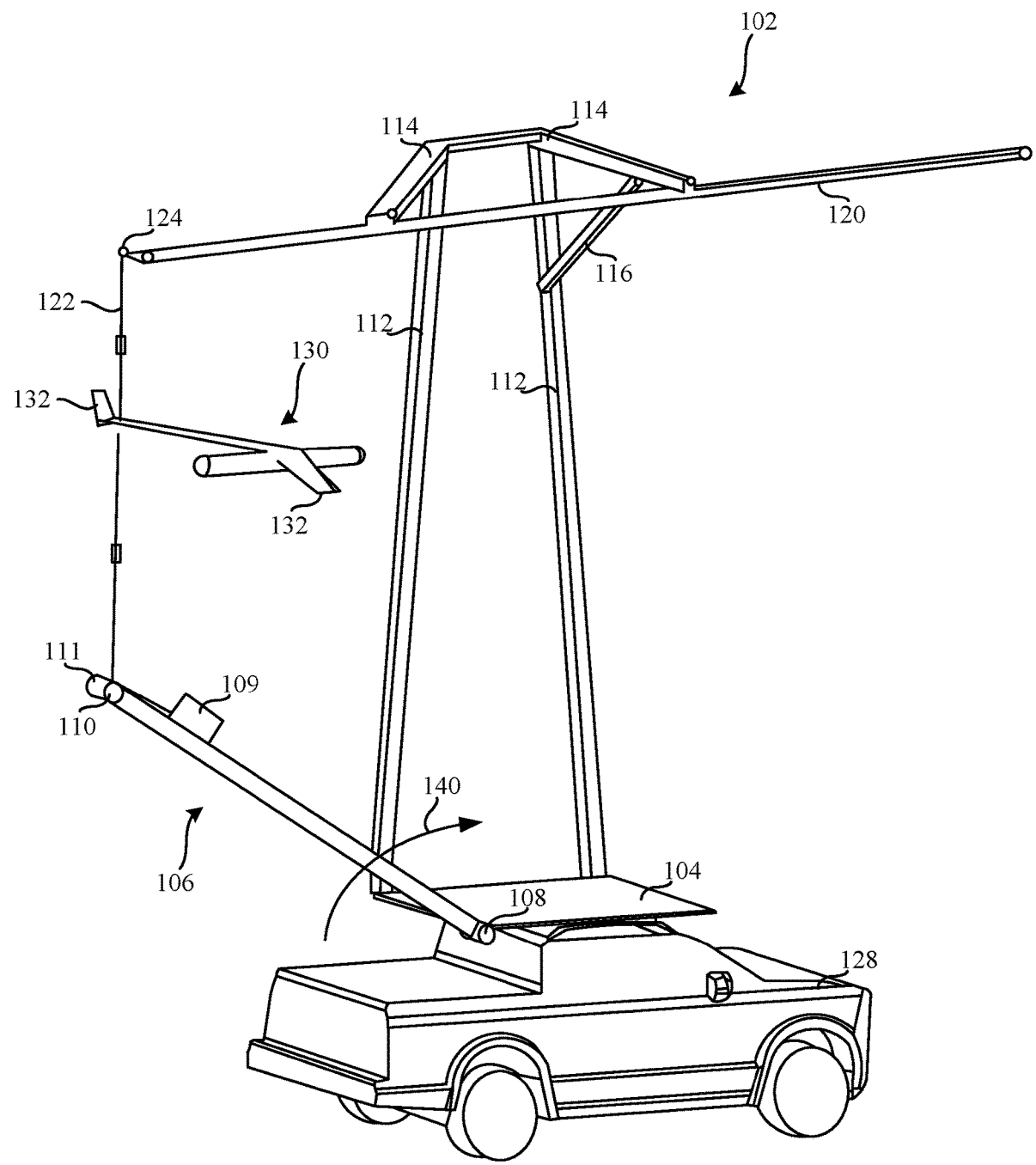
FIG. 1 illustrates an example unmanned aerial vehicle (UAV) recovery system in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Unmanned aerial vehicle (UAV) recovery is disclosed. Some known UAV recovery systems have a relatively large footprint and significant weight. In particular, these UAV recovery systems typically require relatively large and bulky equipment that is difficult to be towed. Further, the known UAV recovery systems can subject a UAV to relatively high loads during impact of the UAV with the UAV recovery system. In particular, the UAV can undergo significant impact forces when a wing of the UAV impacts a net or pole of the UAV recovery system. Further, UAV recovery in these known systems can be relatively chaotic with multiple degrees of freedom of movement that can occur after recovery, thereby potentially resulting in the UAV being damaged (e.g., hitting a structure due to wind, etc.).

Examples disclosed herein enable an effective and relatively low cost recovery of an aircraft (e.g., a UAV) via a stationary platform or a moving vehicle. In particular, examples disclosed herein enable the aircraft to be recovered by a compact and relatively light recovery system that utilizes moving components in combination with friction and/or damping devices, in contrast to relatively larger structures typically implemented in known recovery systems to withstand direct impact forces. Accordingly, examples disclosed herein enable increased mobility in comparison to known recovery systems. Further, examples disclosed herein reduce impact and deceleration forces while allowing the aircraft to be recovered with relative ease. In particular, some examples disclosed herein eliminate backswing of an aircraft typically seen in some cable or rope-based UAV recovery systems.

FIG. 1 illustrates an example unmanned aerial vehicle (UAV) recovery system 100 in accordance with the teachings of this disclosure. The UAV recovery system 100 of the illustrated example includes a UAV/aircraft recovery device (e.g., a recovery apparatus, a recovery system, an aircraft catching device, etc.) 102, which includes a support base (e.g., a platform, a mounting base, etc.) 104, and a rotatable pivot arm (e.g., a lower boom, a rotatable boom, a vertically rotating lower boom, etc.) 106. The pivot arm 106 includes a corresponding rotational pivot (e.g., a pivot axis) 108, a friction and/or damping device (e.g., at least one of a friction device or a damper, a friction device, a damper, a combination of a friction device and a damper) 109 and a first cable connection (e.g., a cable coupling, a cable opening, a pulley, etc.) 110 at a respective distal end 111. The UAV recovery device 102 further includes vertical supports 112, upper supports 114, a support truss 116 and a support rail (e.g., a horizontal track, a horizontal support beam, a suspended mast, etc.) 120. In this example, the support rail 120 supports and/or suspends a cable (e.g., a rope, a tension cable, a line, etc.) 122 via a second cable connection 124. In particular, the cable 122 is suspended between the aforementioned first cable connection 110 and the second cable connection 124.

According to the illustrated example, the UAV recovery device 102 is depicted as mounted on top of a vehicle (e.g., an automobile, a truck, a boat, a hovercraft, etc.) 128. While the example UAV recovery device 102 is shown mounted to the vehicle 128 in this example, the UAV recovery device 102 can be mounted to a stationary structure, such as a building, ship or tower, for example. In other examples, the UAV recovery device 102 can be implemented on another UAV. Further, in the illustrated view of FIG. 1, the UAV recovery device 102 is shown recovering an aircraft (e.g., a UAV) 130 having respective wings 132.

To recover the aircraft 130, one of the wings 132 is brought into contact with the cable 122 that is suspended between the first and second cable connections 110, 124. In particular, the aircraft 130 is flown in a manner in which a distal portion of the wing 132 contacts the cable 122 while the cable 122 is suspended substantially vertical to the ground (in the view of FIG. 1) (e.g., within 0 to 10 degrees relative to a vertical line from the ground). In other examples, another portion (e.g., a fuselage, a hook, an extension, etc.) of the aircraft 130 is brought into contact with the cable 122.

To reduce forces encountered by the aircraft 130 during recovery, contact of the aircraft 130 with the cable 122 rotates the pivot arm 106 about the pivot 108, as generally indicated by an arrow 140. In particular, motion of the aircraft 130 to the right (in the view of FIG. 1) and resultant contact with the cable 122 causes an increase in tension of the cable 122, thereby causing at least a portion of the cable 122 to move along with the aircraft 130 as the aircraft 130 decelerates. In other words, motion of the cable 122, which is guided and/or aligned by the support rail 120 (e.g., guided by guide tracks of the support rail 120), causes rotational motion of the pivot arm 106. Further, in this example, the cable 122 is operatively coupled to the friction and/or damping device 109 (e.g., the cable 122 is coupled to the friction and/or damping device 109 at a distal end of the cable 122). As a result, motion of the cable 122 is resisted or impeded as the pivot arm 106 rotates along with the motion of the aircraft 130, thereby greatly reducing forces encountered by the aircraft 130 as the aircraft 130 decelerates to a stop.

In some examples, the friction and/or damper device 109 can be implemented as linear or non-linear springs, torsional springs, shock dampeners, a fluid-filled shock, a friction spool, a shock assembly, a dashpot, a mechanical friction device, a friction hitch, etc. Additionally or alternatively, the pivot 108 and/or the pivot arm 106 are spring-loaded and/or coupled to springs (e.g., torsional springs, linear springs, etc.) to dampen, resist and/or impede a rotational motion of the pivot arm 106. In some such examples, the pivot 108 can be provided with a torsional spring or the pivot arm 106 can be coupled to a linear spring, which can be, in turn, coupled to the support base 104 or one of the vertical supports 112. Additionally or alternatively, a dashpot is implemented at the pivot 108. In some other examples, the support rail 120, the upper supports 114 and/or the vertical supports 112 swivel and/or rotate in response to the aircraft 130 contacting the cable 122. In some examples, the friction and/or damping device 109 is disposed on the support rail 120 or any support structure of the UAV recovery device 102.

In some examples, the upper supports 114 and/or the vertical supports 112 telescopically extend along respective longitudinal axes. In some examples, the UAV recovery device 102 weighs less than 900 pounds (lbs.). In some examples, the support rail 120 has a height that is between 18 to 20 feet (e.g., 19 feet) from the ground. In some examples, the pivot arm 106, the upper supports 114 and/or the vertical supports 112 are composed of tubing (e.g., aluminum tubing, hollow tubing, etc.). In this example, the aircraft 130 does not backswing relative to the cable 122 during recovery.

Figure 2:
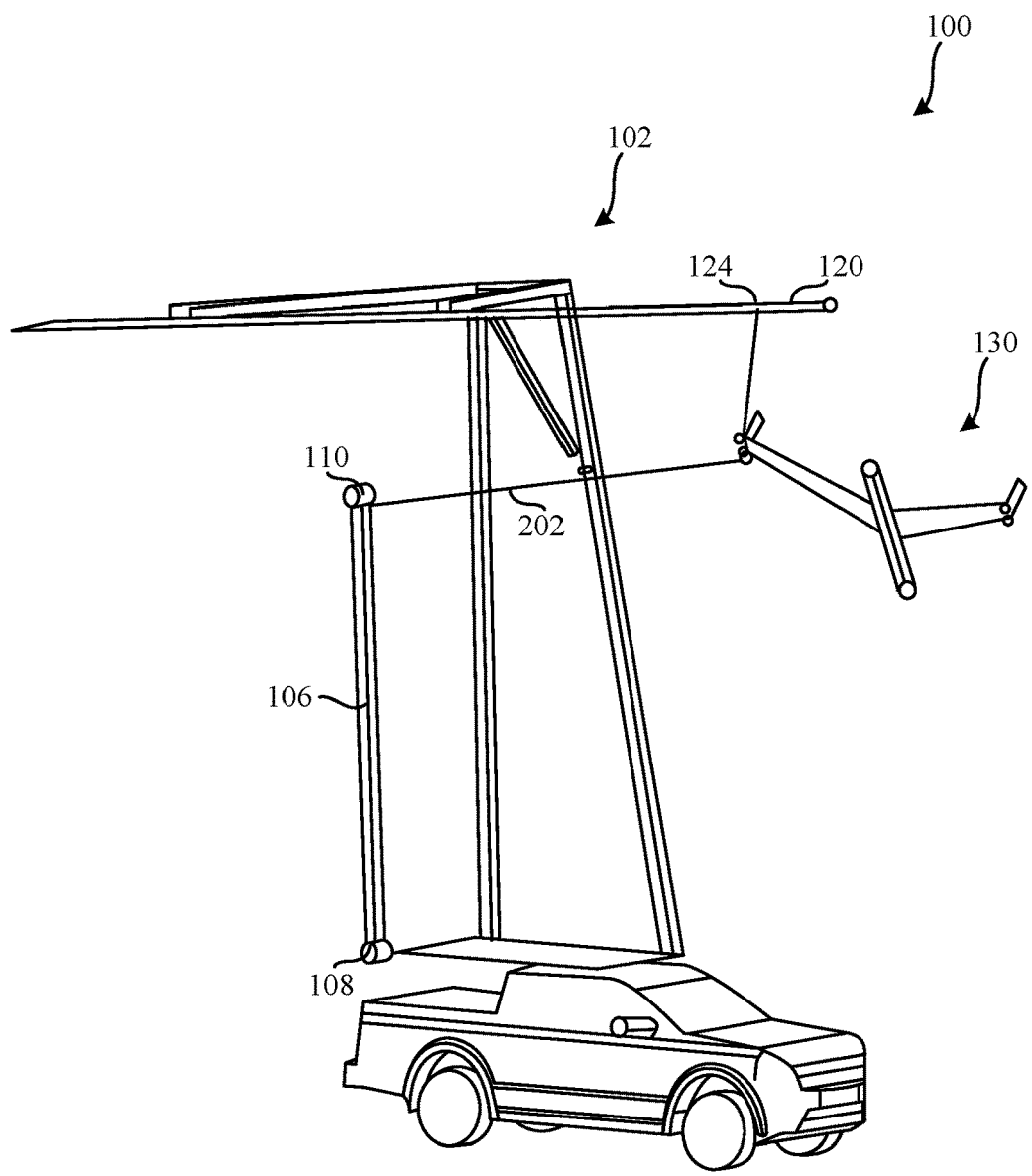
FIG. 2 illustrates the example UAV recovery system of FIG. 1 during capture of a UAV.

FIG. 2 illustrates the example UAV recovery system 100 of FIG. 1 during capture of the aircraft 130 by the UAV recovery device 102. In particular, the aircraft 130 has been nearly brought to a stop and will be suspended from the cable 122 (e.g., the aircraft 130 will rotate about the wing tip to align the wings 132 with the vertical axis from the ground), thereby preventing potential damage to the aircraft 130 that would otherwise result from the aircraft 130 falling and impacting the ground or impacting a structure of the UAV recovery device 102, for example. As can be seen in the illustrated example of FIG. 2, the pivot arm 106 has rotated about the pivot 108 to a substantially vertical orientation relative to ground (in the view of FIG. 2), in contrast to the orientation depicted in FIG. 1. Additionally, the cable 122 has moved along a length of the support rail 120. In other words, the cable 122 is suspended from the support rail 120 at a different portion (e.g., a different portion of an overall length, a different section, etc.) of the support rail 120 from that shown in FIG. 1. According to the illustrated example, the pivot arm 106 rotates the cable 122 between the aircraft 130 and an end of the support rail 120 along a nearly horizontal line of action, thereby enabling a deceleration tension to be substantially horizontal directed through a lower portion 202 of the cable 122 attached to the support rail 120 at the first cable connection 110, thereby resulting in a relatively low cable tension at the second cable connection 124. Accordingly, the vertical supports 112 can be relatively light weight because most or all deceleration loads largely pass through the pivot arm 106 instead of the support rail 120.

Figure 3:
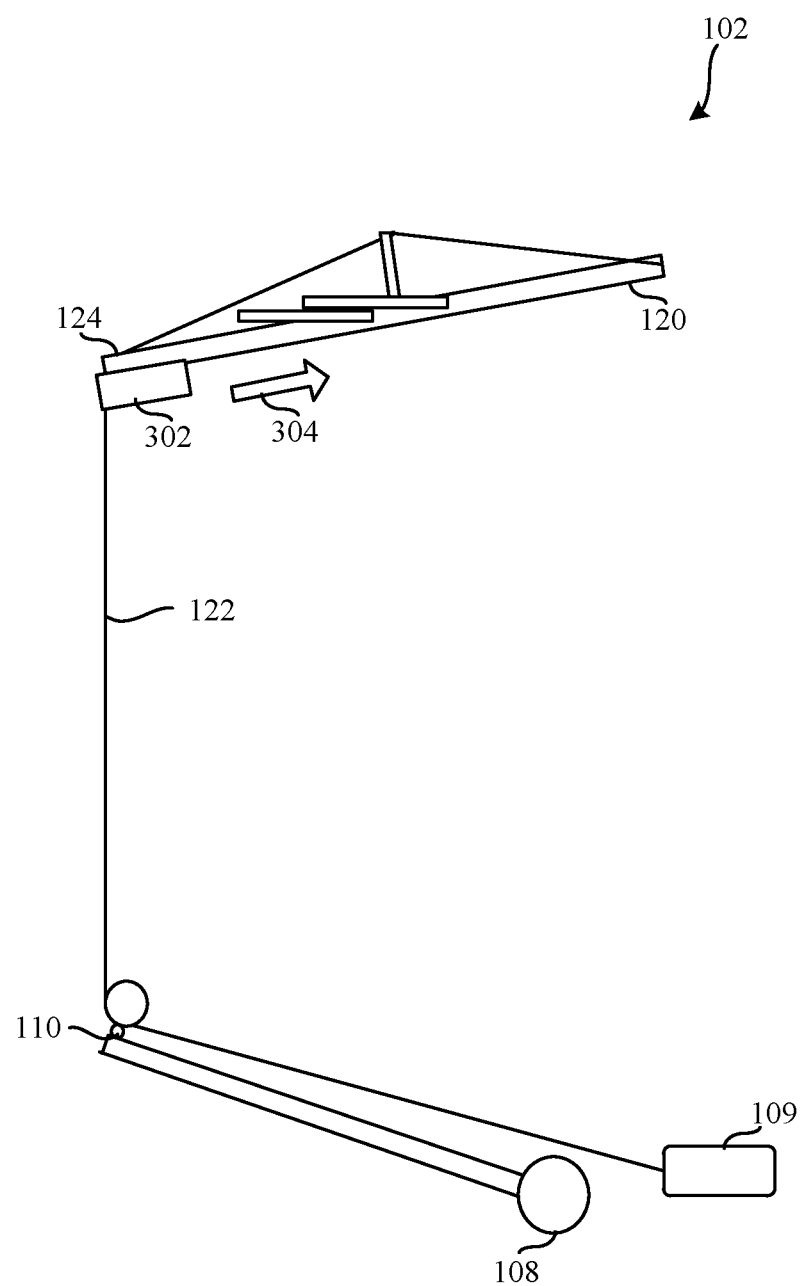
FIG. 3 illustrates a portion of an example UAV recovery device shown in FIGS. 1 and 2.

FIG. 3 illustrates a portion of the example UAV recovery device 102 of FIG. 1. In this example, the cable 122 is shown suspended between the first and second cable connections 110, 124. Further, the support rail 120 includes a track carriage (e.g., a translating pulley, a sliding carriage, a sliding pulley, a track guide, etc.) 302 at or proximate the second cable connection 124. In particular, the track carriage 302 suspends the cable 122 above the first cable connection 110, which is implemented as a pulley in this example. Further, the track carriage 302 moves along at least a portion of a length (e.g., along the length in a guide track) of the support rail 120 while the aircraft 130 (shown in FIG. 1) is being recovered and the pivot arm 106 is rotated about the pivot 108, as generally indicated by an arrow 304. According to the illustrated example, the friction and/or damping device (e.g., a damper, a shock, etc.) 109 is coupled to the cable 122 and positioned proximate or disposed on the pivot arm 106.

In some examples, the friction and/or damping device 109 is implemented as a friction spool or reel around which at least a portion of the cable 122 is wrapped. In some examples, the friction and/or damping device 109 does not move and/or rotate with the pivot arm 106. In some examples, the friction and/or damping device 109 is instead positioned on the support rail 120.

FIGS. 4A-4E illustrate example time steps of a UAV recovery process that implements examples disclosed herein. Turning to FIG. 4A, the wing 132 of the aircraft 130 is shown initially contacting the cable 122 while the aircraft 130 is flown at its initial speed. According to the illustrated view of FIG. 4A, the pivot arm 106 is positioned at its first rotational position or orientation (e.g., an initial position, a pre-recovery position/setting, a ready-to-recover position, a default position, etc.).

Turning to FIG. 4B, the aircraft 130 is depicted beginning to move the cable 122 along with itself at a snag point 404. In particular, slack of the cable 122 is taken up and the pivot arm 106 is still in the first rotational position, but starting to rotate in this example. Further, motion of the track carriage 302 causes the cable 122 to move along a length of the support rail 120.

FIG. 4C depicts the aircraft 130 decelerating and causing rotational motion of the rotatable support arm 106 while the cable 122 continues to move along the support rail 120 via the track carriage 302.

Turning to FIG. 4D, the pivot arm 106 has fully rotated to its second rotational position or orientation (e.g., an extreme position or rotation) while the aircraft 130 continues to pull against the cable 122. In other words, the aircraft 130 has not yet fully stopped even though the pivot arm 106 has moved to the second rotational position.

FIG. 4E depicts the aircraft 130 hanging from the cable 122 and brought to a rest (e.g., to a stop). Further, the pivot arm 106 remains at the aforementioned second rotational position. In some other examples, the aircraft 130 is allowed to drop (e.g., drop to a padded area, the ground, etc.).

Figure 5:
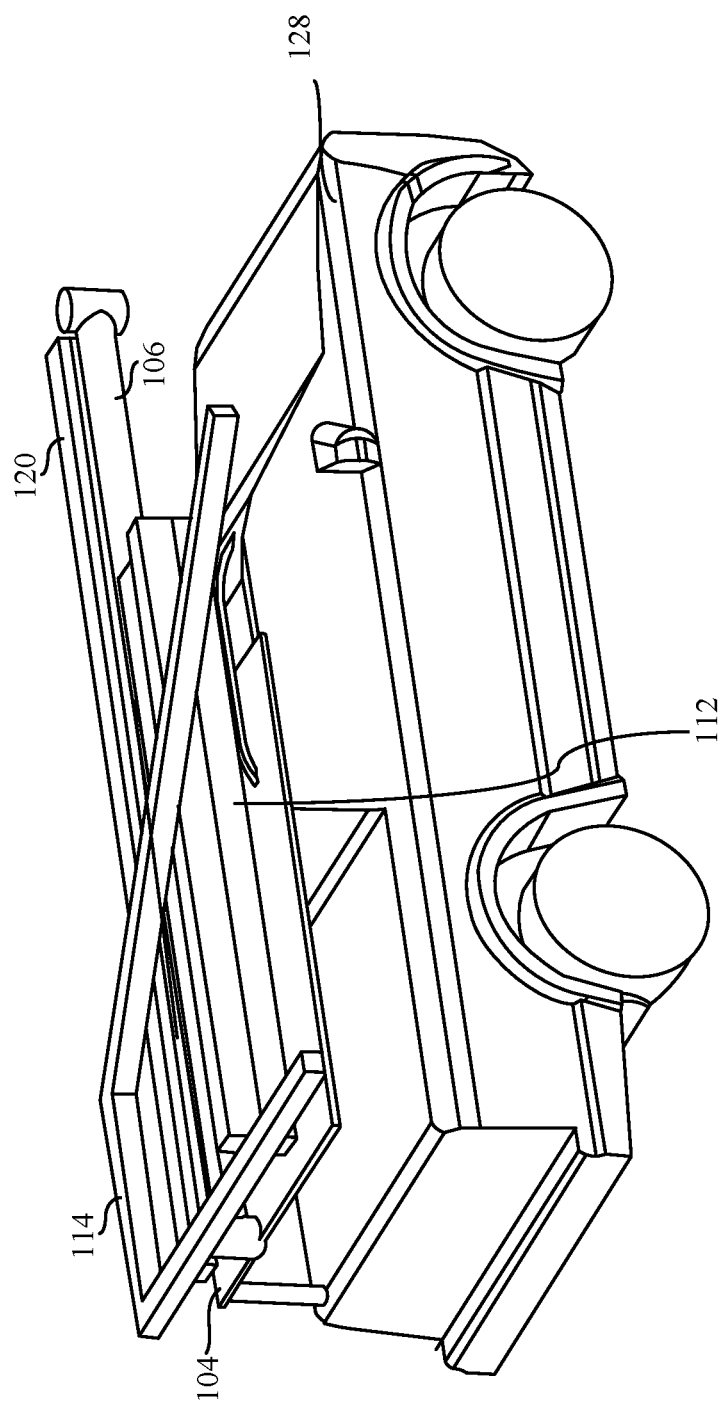
FIG. 5 illustrates example folding and storage that can be implemented in examples disclosed herein.

FIG. 5 illustrates example folding and storage that can be implemented in examples disclosed herein. According to the illustrated example, the pivot arm 106, the vertical supports 112, the upper supports 114 and the support rail 120 are folded and/or disassembled and, subsequently, placed onto the support base 104. In some examples, one or more of the pivot arm 106, the vertical supports 112, the upper supports 114 or the support rail 120 include telescoping or collapsible portions. Accordingly, this folding and/or disassembly results in relatively compact storage thereof for ease of transportation by the vehicle 128.

Figure 6:
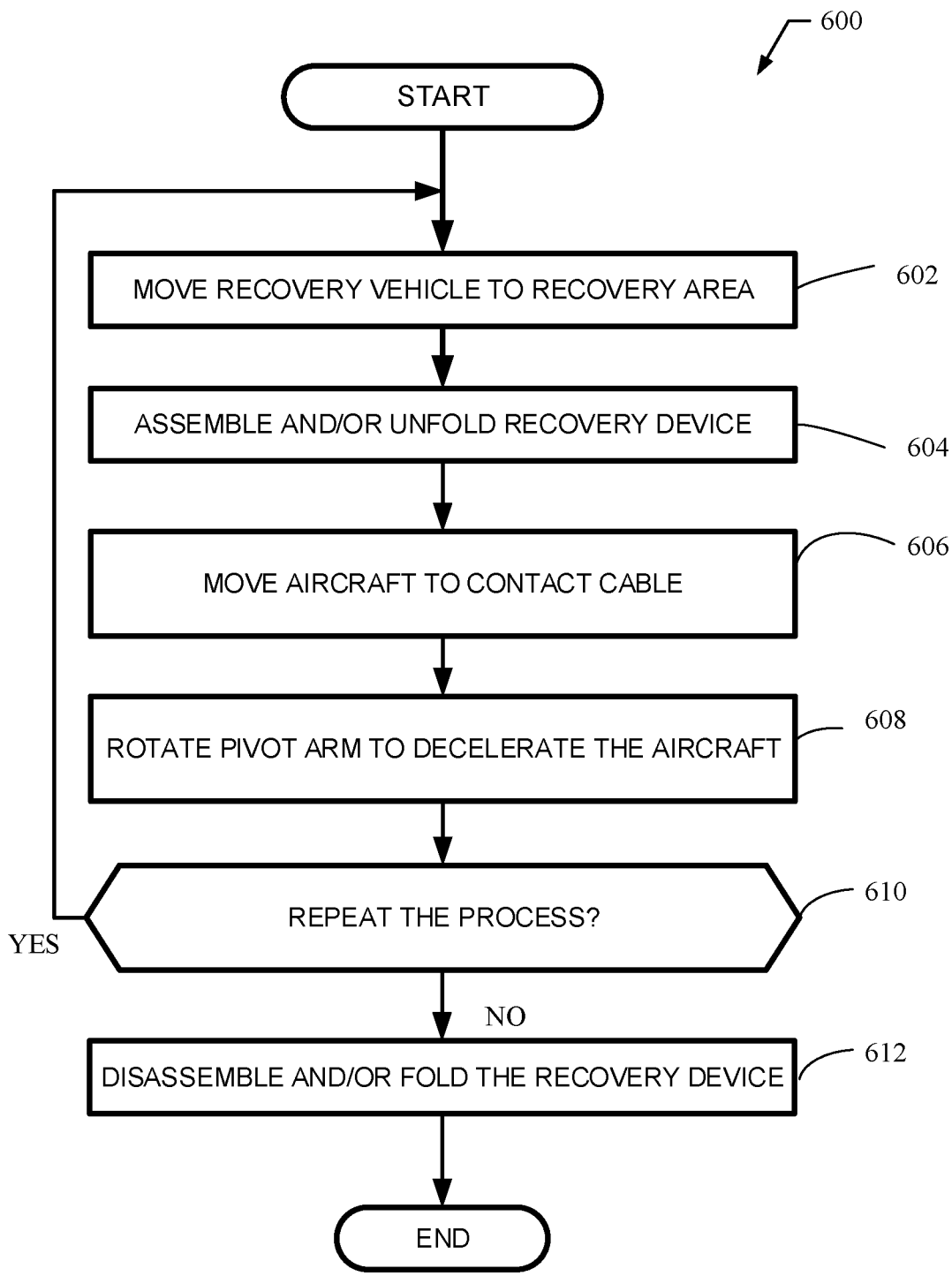
FIG. 6 is a flowchart representative of an example method to implement examples disclosed herein.

FIG. 6 is a flowchart representative of an example method 600 to implement examples disclosed herein. The example method 600 begins as the aircraft 130, which is implemented as a UAV in this example, is to be recovered after the aircraft 130 has completed an in-flight mission.

In examples where the recovery device 102 is implemented on a recovery vehicle, such as the example recovery vehicle 128, the vehicle is moved to a recovery area in which the aircraft 130 is to be recovered (block 602).

At block 604, the UAV recovery device 102 is assembled and/or unfolded. For example, the UAV recovery device 102 is transitioned from a stowed position and deployed and unfolded to recover the aircraft 130 while the aircraft 130 is in flight.

At block 606, the aircraft 130 is moved into contact with the cable 122. In particular, a distal portion of one of the wings 132 is brought into contact with the cable 122 as the cable 122 extends (e.g., extends substantially vertical from ground) between the first and second cable connections 110, 124.

At block 608, the pivot arm 106 is rotated about the pivot 108 when the wing 132 engages the cable 122. Further, motion of the pivot arm 106 affects movement of the cable 122 due to the cable 122 passing through the first cable connection 110. Accordingly, the friction and/or damping device 109 affects motion of the cable 122 to decelerate the aircraft 130 while the aircraft 130 engages and is held by the cable 122.

At block 610, it is then determined whether to repeat the process. If the process is to be repeated, control of the process returns to block 602. Otherwise, the process proceeds to block 612. This determination may be based on whether there are other aircraft to be recovered.

At block 612, the recovery device 102 is disassembled and/or folded and the process ends. For example, the recovery device 102 is disassembled and/or folded to enable transport of the recovery device 102 by the vehicle 128.

Example 1 includes an apparatus to recover an unmanned aerial vehicle (UAV). The apparatus includes a support rail to support a cable, and a pivot arm to rotate about a pivot, where the cable is suspended between the support rail and the pivot arm, and where the pivot arm is rotated to a first orientation when the UAV contacts the cable and rotated to a second orientation when the UAV is brought to a stop. The apparatus also includes at least one of a friction device or a damper operatively coupled to the cable to resist motion of the cable during rotation of the pivot arm from the first orientation to the second orientation.

Example 2 includes the apparatus of Example 1, and further includes a track guide coupled to the support rail, wherein the track guide is to guide a track carriage that suspends the cable from the support rail.

Example 3 includes the apparatus of Example 2, where the track carriage is moved to an initial position to cause the cable to be substantially vertical when the pivot arm is rotated to the first orientation.

Example 4 includes the apparatus of Example 1, where the at least one of the friction device or the damper includes a friction spool.

Example 5 includes the apparatus of Example 4, where the friction spool is disposed on the pivot arm.

Example 6 includes the apparatus of Example 1, where the at least one of the friction device or the damper includes a spring.

Example 7 includes the apparatus of Example 1, where the at least one of the friction device or the damper is positioned proximate a distal end of the pivot arm.

Example 8 includes the apparatus of Example 1, and further includes a mount to mount the support rail and the pivot arm to a vehicle.

Example 9 includes the apparatus of Example 1, and further includes a mount to mount the support rail and the pivot arm to a platform.

Example 10 includes an aircraft recovery device having a support rail including a guide track along which a track carriage is to move, a pivot arm to rotate about a pivot, and a cable suspended between the track carriage and the pivot arm. The aircraft recovery device also includes at least one of a friction device or a damper operatively coupled to the cable, where the at least one of the friction device or the damper is to resist motion of the cable when an aircraft contacts the cable and rotates the pivot arm during recovery of the aircraft.

Example 11 includes the aircraft recovery device of Example 10, where the pivot arm includes a pulley to suspend the cable proximate a distal end of the pivot arm.

Example 12 includes the aircraft recovery device of Example 10, where the at least one of the friction device or the damper includes a friction spool.

Example 13 includes the aircraft recovery device of Example 12, where the friction spool is disposed on the pivot arm.

Example 14 includes the aircraft recovery device of Example 10, where the at least one of the friction device or the damper includes a spring.

Example 15 includes the aircraft recovery device of Example 10, and further includes a mount to mount the aircraft recovery device to a vehicle.

Example 16 includes the aircraft recovery device of Example 10, where the cable is to move to a substantially horizontal orientation to ground as the pivot arm rotates.

Example 17 includes a method including moving an unmanned aerial vehicle (UAV) toward a cable suspended between a support rail and a pivot arm that rotates about a pivot, and causing the pivot arm to rotate about the pivot when the UAV contacts the cable, where the cable is operatively coupled to at least one of a friction device or a damper that resists motion of the cable as the pivot arm rotates.

Example 18 includes the method of Example 17, and further includes suspending the UAV, via the cable, once the UAV has been brought to a stop.

Example 19 includes the method of Example 17, and further includes moving a recovery vehicle supporting the pivot arm and the support rail to a recovery area to receive the UAV.

Example 20 includes the method of Example 17, and further includes guiding movement of a track carriage via a guide track, wherein the track carriage suspends the cable from the support rail.

Example 21 includes the method of Example 20, and further includes moving the track carriage to an initial position before the UAV contacts the cable, wherein the initial position corresponds to the cable hanging vertically.

Example 22 includes the method of Example 17, and further includes folding the support rail and the pivot arm toward a support base.

From the foregoing, it will be appreciated that example methods, apparatus and articles of manufacture have been disclosed that enable relatively low cost, compact, portable and effective aircraft recovery. Examples disclosed herein can also significantly reduce forces encountered by an aircraft during recovery and, thus, reduce a probability and severity of damage.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown and described in the context of aircraft recovery, examples disclosed herein can be applied to any application related to recovering moving objects and/or vehicles.

What is claimed is:

1. An apparatus to recover an unmanned aerial vehicle (UAV), the apparatus comprising:
a support rail to support a cable;
a pivot arm to rotate about a pivot, wherein the pivot arm is rotated to a first orientation when the UAV contacts the cable and rotated to a second orientation when the UAV is brought to a stop;
at least one of a friction device or a damper operatively coupled to the cable to resist motion of the cable during rotation of the pivot arm from the first orientation to the second orientation; and
a track guide coupled to the support rail, wherein the track guide is to guide a track carriage that suspends the cable from the support rail, a portion of the cable suspended between the track carriage and the pivot arm to contact the UAV, wherein the pivot arm is to rotate relative to the track guide.

2. The apparatus as defined in claim 1, wherein the track carriage is moved to an initial position to cause the cable to be substantially vertical when the pivot arm is rotated to the first orientation.

3. The apparatus as defined in claim 1, wherein the at least one of the friction device or the damper includes a friction spool.

4. The apparatus as defined in claim 3, wherein the friction spool is disposed on the pivot arm.

5. The apparatus as defined in claim 1, wherein the at least one of the friction device or the damper includes a spring.

6. The apparatus as defined in claim 1, wherein the at least one of the friction device or the damper is positioned proximate a distal end of the pivot arm.

7. The apparatus as defined in claim 1, further including a mount to mount the support rail and the pivot arm to a vehicle or a ship.

8. The apparatus as defined in claim 1, further including a mount to mount the support rail and the pivot arm to a platform.

9. The apparatus defined in claim 1, wherein the pivot arm rotates about a rotational axis in a direction that is perpendicular to a direction of travel of the track carriage along the track guide.

10. The apparatus defined in claim 9, wherein the pivot arm rotates about the rotational axis of the pivot along a plane defined by a longitudinal length of the track guide.

11. An aircraft recovery device comprising:
a support rail including a track guide along which a track carriage is to move;
a pivot arm to rotate about a pivot, wherein the pivot arm is to rotate relative to the track guide;
a cable suspended between the track carriage and the pivot arm, a portion of the cable suspended between the track carriage and the pivot arm to contact an aircraft; and
at least one of a friction device or a damper operatively coupled to the cable, the at least one of the friction device or the damper to resist motion of the cable when the aircraft contacts the cable and rotates the pivot arm during recovery of the aircraft.

12. The aircraft recovery device of claim 11, wherein the pivot arm includes a pulley to suspend the cable proximate a distal end of the pivot arm.

13. The aircraft recovery device of claim 11, wherein the at least one of the friction device or the damper includes a friction spool.

14. The aircraft recovery device of claim 13, wherein the friction spool is disposed on the pivot arm.

15. The aircraft recovery device of claim 11, wherein the at least one of the friction device or the damper includes a spring.

16. The aircraft recovery device of claim 11, further including a mount to mount the aircraft recovery device to a vehicle.

17. The aircraft recovery device of claim 11, wherein the cable is to move to a substantially horizontal orientation to ground as the pivot arm rotates.

18. A method comprising:
  moving an unmanned aerial vehicle (UAV) toward a cable suspended between a support rail and a pivot arm that rotates about a pivot, wherein a track guide is movably coupled to the support rail;
  guiding movement of a track carriage via the track guide, wherein the track carriage suspends the cable from the support rail, a portion of the cable suspended between the track carriage and the pivot arm to contact the UAV; and
  causing the pivot arm to rotate about the pivot relative to the track guide when the UAV contacts the cable, wherein the cable is operatively coupled to at least one of a friction device or a damper that resists motion of the cable as the pivot arm rotates.

19. The method as defined in claim 18, further including suspending the UAV, via the cable, once the UAV has been brought to a stop.

20. The method as defined in claim 18, further including moving a recovery vehicle supporting the pivot arm and the support rail to a recovery area to receive the UAV.

21. The method as defined in claim 18, further including moving the track carriage to an initial position before the UAV contacts the cable, wherein the initial position corresponds to the cable hanging vertically.

22. The method as defined in claim 18, further including folding the support rail and the pivot arm toward a support base.

* * * * *